United States Patent [19]

Buhler et al.

[11] 4,388,329

[45] Jun. 14, 1983

[54] PROCESS FOR THE PRODUCTION OF A PASTEURIZED CHEESE IN POWDER FORM

[75] Inventors: Marcel Buhler, Tolochenaz, Switzerland; Mats Olofsson, Astorp, Sweden

[73] Assignee: Societe d'Assistance Technique pour Produits Nestle S.A., Lausanne, Switzerland

[21] Appl. No.: 281,063

[22] Filed: Jul. 7, 1981

[30] Foreign Application Priority Data

Jul. 11, 1980 [CH] Switzerland ............... 5333/80

[51] Int. Cl.³ ............... A23C 9/16; A23C 19/00
[52] U.S. Cl. ............... 426/40; 426/471; 426/491; 426/582
[58] Field of Search ............... 426/582, 36, 40, 491, 426/588, 471; 260/112 R

[56] References Cited

U.S. PATENT DOCUMENTS

| | | | |
|---|---|---|---|
| 3,899,595 | 8/1975 | Stenne | 426/582 |
| 3,899,596 | 8/1975 | Stenne | 426/582 |
| 3,922,374 | 11/1975 | Bell et al. | 426/582 |
| 4,066,800 | 1/1978 | Rosenau et al. | 426/582 |

*Primary Examiner*—Raymond N. Jones
*Assistant Examiner*—George C. Yeung
*Attorney, Agent, or Firm*—Vogt & O'Donnell

[57] ABSTRACT

To obtain a pasteurized cheese in powder form which, after reconstitution, has the properties of Mozzarella, a colloidal lactic solution having protein/lactose and protein/calcium ratios at least about twice as high as those of natural milk and a pH of from 5.0 to 5.5 is prepared, the pH of the solution thus prepared is adjusted to between 6.3 and 6.4, the solution is pasteurized and its pH is returned to 5.0 to 5.5 before drying by spray-drying.

10 Claims, No Drawings

PROCESS FOR THE PRODUCTION OF A PASTEURIZED CHEESE IN POWDER FORM

This invention relates to a process for the production of a pasteurised cheese in powder form which, after reconstitution, has the properties of Mozzarella.

It is known that Mozzarella is a cheese with stretching the stringing properties which is used in large quantities in the production of pizzas. The often artisanal processes for producing Mozzarella generally result in the formation of a curd which is very difficult to handle. The individual operations involved are numerous and laborious and involve relatively high production costs. In addition, major problems are involved in the distribution and keeping of this cheese, in addition to which there are no absolute guarantees from the bacteriological point of view. In addition, the fact that it is virtually impossible to find any stable commercial product containing all the ingredients required for the production of a pizza, including cheese, shows how difficult it is to provide for public consumption a powder-form cheese of which the taste, appearance and properties after reconstitution are the same as those of Mozzarella.

There is already a known process for producing Mozzarella in powder form, although the cheese obtained in this known process, by the nature of its individual operations, is not a pasteurised cheese. Although the bacteriological risks may readily be controlled in a modern distribution circuit, there is a risk that non-pasteurised Mozzarella in powder-form will be left for too long on the shelves of a rural grocery store or will not be properly stored or used by the consumer.

The invention specifically provides a solution to these bacteriological problems because it enables a pasteurised cheese to be produced in powder form. The invention relates to a production process in which a colloidal lactic starting solution having protein/lactose and protein/calcium ratios at least about twice as high as those of natural milk and a pH-value in the range from 5.0 to 5.5 is prepared, this solution is adjusted to a pH-value of from 6.3 to 6.4 and pasteurised, the pH is returned to a value of from 5.0 to 5.5, and finally the solution is dried to give said cheese in powder form.

In the context of the invention, the expression "colloidal lactic solution" is understood to mean an aqueous solution which essentially consists of the constituents encountered in animal milk and which has the principal properties thereof.

Accordingly, the first step of the process according to the invention comprises preparing this colloidal lactic solution. In a first embodiment, this solution is obtained by reconstitution in water using for example concentrates or powders of casein, lactalbumin (if desired), lactose, mineral salts ... The properties are such that the solution obtained has protein/lactose and protein/calcium ratios at least about twice as high as those in natural milk. The pH is adjusted by chemical acidification, for example using hydrochloric acid. In a preferred variant, the pH-value is adjusted by biological acidification, in particular using the normal acidifying ferments of milk.

In another embodiment, the colloidal lactic solution is prepared by ultrafiltration. In this way, it is possible directly to obtain as retentates products having protein/lactose and protein/calcium ratios at least about twice as high as those of the milk used. If desired, particularly for adjusting the protein/lactose ratio and the demineralisation level, it is possible to apply diafiltration, i.e. to dilute the retentate during the ultrafiltration step. In the same way as before, the pH-value is adjusted chemically or biologically, acidification being possible with the dilution solution used in the event of diafiltration which may consist of a cheese whey for example. Ultrafiltration may even be carried out at elevated temperature if it is desired to increase the yield of treated product. In this particular case, the proteins may be denatured beforehand by heating, in particular by the injection of steam.

In a preferred variant, a whole milk or skimmed milk is biologically acidified to a pH value of only from 5.8 to 6.0. This acidified milk is then subjected to ultrafiltration and biological acidification is allowed to continue during the ultrafiltration step so that the retentate obtained is the starting colloidal lactic solution which has both the above-mentioned ratios higher than those of natural milk and the desired pH-value in the range from 5.0 to 5.5.

It should be pointed out that the use of ultrafiltration has the advantage of a better yield because the serum proteins or lactalbumin are retained and end up in the powder-form cheese. In addition, a higher acceptable lactose content is not only possible, but also readily controllable.

The next step of the process comprises raising the pH of the solution to a value of from 6.3 to 6.4 which may readily be achieved by the addition of an alkali, such as sodium hydroxide for example. Pasteurisation becomes possible at a pH-value of this order whereas, at a pH-value in the range from 5.0 to 5.5, it would have given rise to precipitation of the product. Pasteurisation may be carried out by the injection of steam, for example at a temperature in the range from 70° to 140° C.

When the pH-value of the solution is in the range from 6.3 to 6.4, a fat, such as butter oil, peanut oil or soya oil or even a high-melting fat, such as hydrogenated palm oil for example, may be added, especially with heating, for example to a temperature of approximately 55° to 65° C. The object of adding a fat is to standardise the powder-form cheese or to form a cheese having normal fat content where the starting colloidal solution is a skimmed milk solution. If it is desired to obtain a low-fat cheese, it is of course possible to start with an at least partly skimmed-milk solution and not to add any fat. The solution obtained after the addition of fat is preferably homogenised before pasteurisation, for example using a homogenizer or directly by the injection of steam.

The subsequent step, re-acidification of the solution to a pH-value of from 5.0 to 5.5, may be carried out chemically or biologically in the same way as for the starting solution. It is preferably carried out chemically by the addition of hydrochloric acid. Under these conditions, the salt formed through neutralisation and chemical acidification replaces at least a large part of the salt which would otherwise have to be added to the product before drying. Rectification is again preferably carried out after cooling to between 5° and 10° C.

Finally, the solution is dried to form a powder. Drying may be carried out in any way, for example in a spray-drier or by freeze-drying.

It should be pointed out here that the process according to the invention differs radically from the traditional processes for producing Mozzarella because, in these traditional processes, the starting milk is coagulated which involves a physico-chemical modification of the proteins and a fundamental change in their properties. By contrast, in the process according to the invention, the proteins do not have to undergo any modification and may remain in their native state. There is no coagulation.

The powder-form cheese obtained is a pasteurised cheese which is thus characterised by bacteriological stability. After reconstitution in water, it forms a paste which has the stretching properties and the behaviour of Mozzarella. Accordingly, this cheese may readily be used as a substitute for the traditional cheese, particularly in the production of pizzas.

The process according to the invention is illustrated by the following Examples in which the percentages quoted represent percentages by weight.

EXAMPLE 1

A standardised milk is pasteurised for 15 s at 72° C. After cooling to 37° C., the milk thus pasteurised is inoculated with a thermophilic lactic starter, acidification being left to continue to a pH equal to 5.9. After cooling to 20° C., ultrafiltration is carried out in an apparatus of the plate type equipped with cellulose acetate membranes having a cut-off of 6000. Ultrafiltration is carried out at a temperature of 20° C. to a reduction in volume of 3 to 1 which means that the volume of the retentate is one third of the volume of the starting milk. During ultrafiltration, acidification continues and the retentate has a pH equal to 5.2.

This pH is raised to 6.3 by the addition of a solution of sodium hydroxide, followed by pasteurisation by the injection of steam for 15 s at 80° C.

The pasteurised product is then cooled in a plate-type heat exchanger to a temperature of the order of 8° C. and then reacidified to pH 5.2 by the addition of hydrochloric acid.

This product, which has the stretching and stringing properties, is introduced into a drying tower from which a powder is collected.

When reconstituted in water, this powder gives a stringy paste which so resembles as to be mistaken for Mozzarella. It may be used in the production of pizzas.

EXAMPLE 2

A skimmed milk is pasteurised for 15 s at 75° C. The milk thus pasteurised is cooled to 37° C. and inoculated with a culture of lactic ferments. Biological acidification is left to continue to pH 5.8. After cooling to 20° C., ultrafiltration is carried out in an apparatus of the tubular type equipped with cellulose acetate membranes having a cut-off of 20'000. Ultrafiltration is continued at ambient temperature to a reduction in the volume of the retentate to one third of the initial volume. During ultrafiltration, acidification is continued and the retentate has a pH equal to 5.3. The retentate is neutralised to pH 6.3 by the addition of sodium hydroxide and then heated to 50° C. Hydrogenated palm oil having a temperature of 60° C. is then added in such a quantity that the end product contains 45% of fats based on dry matter. The concentrate thus standardised is homogenised under a pressure of 200 bars. It is heated for 20 s to 82° C. by the injection of steam and then cooled to 10° C. in a plate-type heat exchanger. Its pH is adjusted to 5.2 by the addition of hydrochloric acid, followed by spray drying. A powder is obtained which, after reconstitution, has the same properties as Mozzarella, particularly its stretching and stringing properties.

If this powder is rehydrated with different quantities of water ranging from 40 to 60% by weight of dry powder and then heated to different temperatures ranging from 50° to 80° C., a pasty mass is obtained in each case, so resembling as to be mistaken for Mozzarella.

If the powder is rehydrated without heating and if a pizza is made with the mass obtained, the product removed from the oven has the appearance, texture and taste of a pizza made from traditional Mozzarella.

EXAMPLE 3

A powder is prepared in the same way as described in Example 2 except that melted butter is used instead of the hydrogenated palm oil. A product having the properties described in Example 2 is obtained.

EXAMPLE 4

A reconstituted skimmed milk having a dry matter content of 15% is prepared from skimmed milk powder. It is then sterilised for 10 s at 120° C. by the injection of steam. After cooling to 10° C., the product thus sterilised is acidified to pH 5.2 by the addition of hydrochloric acid. It is then subjected to ultrafiltration and to diafiltration on a continuous production line equipped with modules of the tubular type fitted with membranes having a cut-off of 20'000. This operation is continued until the retentate has a lactose content of 20% based on dry matter. Its pH is then adjusted to pH 6.3 by the addition of sodium hydroxide, followed by heating to 55° C. Soya oil heated to 60° C. is then added to the retentate which thereafter is treated at a temperature of 120° C. by the injection of steam for 10 s. After cooling to 10° C., it is adjusted to a pH of 5.2 by the addition of HCl and dried by spray-drying. A powder is obtained in which the particles of fat are attached particularly firmly to the proteins and which, after reconstitution, has the properties of a particularly creamy Mozzarella.

EXAMPLE 5

A fresh skimmed milk is subjected to heat treatment at 120° C. for 30 s by the injection of steam. It is then subjected to hot ultrafiltration at a temperature of 55° C. in an apparatus of the plate type equipped with cellulose acetate membranes having a cut-off of 20'000 which enables a better output to be obtained. A retentate having a dry matter content of 15% is collected. It is cooled to 38° C., inoculated with 2% of a culture of thermophilic lactic ferments containing acidification activators and acidification left to continue to pH 5.3. The product is now subjected to diafiltration to adjust the protein/lactose ratio and to obtain the required demineralisation level. The pH is increased to 6.2 by the addition of NaOH and hydrogenated palm oil is added in a quantity calculated to give a fat content of 45% based on dry matter. The mixture is homogenised, pasteurised at 85° C., cooled to 10° C. acidified to pH 5.2 with lactic acid and dried by spray drying. A powder is obtained which, after reconstitution, has the properties of Mozzarella.

EXAMPLE 6

A skimmed milk having a dry matter content of 20% is prepared by reconstitution and then pasteurised for 15 s at 75° C., followed by cooling to 20° C. The product is then subjected to ultrafiltration and to diafiltration with an overacidified lactoserum emanating from the production of a soft cheese. Diafiltration is continued to a pH-value of 5.2. The further procedure is then as described in Example 5, giving a powder which, after reconstitution, has the properties of Mozzarella.

We claim:

1. A process for the production of a pasteurised cheese in powder form which, after reconstitution, has the properties of Mozzarella, and which process does not cause the coagulation of proteins, which comprises
preparing a colloidal lactic starting solution having protein/lactose and protein/calcium ratios at least about twice as high as those of natural milk and a pH-value in the range from 5.0 to 5.5,
adjusting the solution thus prepared to a pH-value of from 6.3 to 6.4 and heating the pH adjusted solution to a temperature sufficient to pasteurize the solution but below that which would cause the coagulation of proteins it,
returning the pH of the pasteurized solution to a value of from 5.0 to 5.5 and
drying the solution to give the cheese in powder form.

2. A process as claimed in claim 1, wherein the colloidal lactic starting solution consists at least partially of skimmed milk.

3. A process as claimed in claim 1, wherein the colloidal lactic starting solution is obtained by mixing its constituents in powdered form with water.

4. A process as claimed in claim 1, wherein the colloidal lactic starting solution is obtained by the ultrafiltration of a milk.

5. A process as claimed in claim 2, wherein fat is added when the pH-value of the solution is between 6.3 and 6.4.

6. A process as claimed in claim 5, wherein the fat is added at a temperature of from 55° to 65° C.

7. A process as claimed in claim 4, wherein a milk is acidified biologically to a pH-value of from 5.8 to 6.0 and the biological acidification process is left to continue during ultrafiltration to a pH-value of from 5.0 to 5.5.

8. A process as claimed in claim 4, wherein the pH-value is chemically or biologically adjusted before, during or after ultrafiltration and the protein/lactose ratio and demineralisation level of the colloidal solution is adjusted by diafiltration.

9. A process as claimed in claim 4, wherein acidification is carried out by diafiltration with a dilute acid solution.

10. A process for the production of a pasteurised cheese in powder form which, after reconstitution, has the properties of Mozzarella, and which process does not cause the coagulation of proteins, comprising:
(a) preparing a colloidal lactic starting solution having protein/lactose and protein/calcium ratios at least about twice as high as those of natural milk and a pH-value in the range of from 5.0 to 5.5;
(b) adjusting the solution thus prepared to a pH-value of from 6.3 to 6.4 and heating the pH adjusted solution to a temperature sufficient to pasteurize the solution but below that which would cause the coagulation of proteins;
(c) cooling the pasteurised solution to a temperature of between 5° and 10° C.;
(d) returning the pH of the solution to a value of from 5.0 to 5.5; and then
(e) drying the solution to provide the cheese in powder form.

* * * * *

UNITED STATES PATENT AND TRADEMARK OFFICE
CERTIFICATE OF CORRECTION

PATENT NO. : 4,388,329
DATED : June 14, 1983
INVENTOR(S) : MARCEL BUHLER & MATS OLOFSSON It is certified that error appears in the above—identified patent and that said Letters Patent is hereby corrected as shown below:

Column 1, line 9, "the" should read --and--.

Column 1, line 57, "properties" should read --proportions--.

Column 2, line 61, "Rectification" should read --Reacidification--.

Claim 1, column 5, line 17, delete "it".

Signed and Sealed this

Twenty-second Day of May 1984

[SEAL]

Attest:

Attesting Officer

GERALD J. MOSSINGHOFF
Commissioner of Patents and Trademarks